United States Patent
Wilson

(10) Patent No.: US 10,879,728 B2
(45) Date of Patent: Dec. 29, 2020

(54) EMERGENCY LIGHTING UNIT WITH AC POWER CHARGING

(71) Applicant: TRIDONIC GMBH & CO KG, Dornbirn (AT)

(72) Inventor: Ian Wilson, Sunderland (GB)

(73) Assignee: TRIDONIC GMBH & CO KG, Dornbirn (AT)

( * ) Notice: Subject to any disclaimer, the term of this patent is extended or adjusted under 35 U.S.C. 154(b) by 259 days.

(21) Appl. No.: 16/067,907

(22) PCT Filed: Jan. 2, 2017

(86) PCT No.: PCT/EP2017/050019
§ 371 (c)(1),
(2) Date: Jul. 3, 2018

(87) PCT Pub. No.: WO2017/121653
PCT Pub. Date: Jul. 20, 2017

(65) Prior Publication Data
US 2020/0083741 A1    Mar. 12, 2020

(30) Foreign Application Priority Data
Jan. 11, 2016  (GB) .................................. 1600724.7

(51) Int. Cl.
*H02J 7/02*     (2016.01)
*H02J 9/06*     (2006.01)
(Continued)

(52) U.S. Cl.
CPC ........ *H02J 9/02* (2013.01); *H02J 7/02* (2013.01); *H02J 9/061* (2013.01); *H05B 47/10* (2020.01)

(58) Field of Classification Search
CPC ...... H02J 9/02; H02J 9/06; H02J 9/061; H02J 7/02; H05B 47/10
(Continued)

(56) References Cited

U.S. PATENT DOCUMENTS

| 3,801,794 A | 4/1974 | Mauch et al. |
| 6,735,096 B2 | 5/2004 | Chang et al. |

(Continued)

FOREIGN PATENT DOCUMENTS

| WO | 9211741 | 7/1992 | |
| WO | WO-2010041168 A1 * | 4/2010 | ............. H05B 45/37 |
| WO | 2011124723 | 10/2011 | |

OTHER PUBLICATIONS

Great Britain search report dated Jul. 7, 2016 in priority application GB1600724.7.

(Continued)

*Primary Examiner* — Hal Kaplan
(74) *Attorney, Agent, or Firm* — Andrus Intellectual Property Law

(57) ABSTRACT

An emergency unit (1) is provided, comprising input terminals (I1, I2) for supplying the emergency unit (1) with AC power, a battery charging unit (40) designed for charging a battery unit (30) of the emergency unit (1) by using the AC power, a DC/DC converter (10), supplied by the battery unit (30) and designed to provide DC power to DC power output terminals (O1, O2) designed for supplying power to emergency lighting means (EL), a control unit (20) designed for being supplied with a signal indicating the state of the AC power and for outputting commands to the battery charging unit (40) and to the DC/DC converter (10). The control unit (20) can assume a state (S6) in which it causes the DC/DC converter (10) to provide DC power based on the battery unit and at the same time start the operation of the battery charging unit (40).

14 Claims, 2 Drawing Sheets

(51) Int. Cl.
*H02J 9/02* (2006.01)
*H05B 47/10* (2020.01)

(58) Field of Classification Search
USPC .............................................. 307/20, 64, 66
See application file for complete search history.

(56) References Cited

U.S. PATENT DOCUMENTS

| | | |
|---|---|---|
| 7,498,770 B1 | 3/2009 | Caldwell |
| 2007/0190848 A1 | 8/2007 | Zhang |
| 2012/0104858 A1 | 5/2012 | Noe |
| 2013/0147269 A1 | 6/2013 | Zimmermann et al. |
| 2014/0084847 A1 | 3/2014 | Tseng et al. |
| 2015/0091383 A1 | 4/2015 | Schmucki |
| 2015/0380968 A1 | 12/2015 | Lee |

OTHER PUBLICATIONS

International Search Report dated Feb. 10, 2017 in parent application PCT/EP2017/050019.
European Search report in co-pending European Patent Application 17 700 015.5 dated Aug. 1, 2019.

* cited by examiner

EMERGENCY LIGHTING UNIT WITH AC POWER CHARGING

CROSS REFERENCE TO RELATED APPLICATIONS

The The present application is the U.S. national stage application of International Application PCT/EP2017/050019, filed Jan. 2, 2017 which international application was published on Jul. 20, 2017 as International Publication WO 2017/121653 A1. The International Application claims priority to Great Britain Application 1600724.7 filed Jan. 11, 2016.

FIELD OF THE INVENTION

The invention relates to an emergency unit that supplies devices connected especially to an emergency bus with power and in particular with a DC power or voltage in case an emergency situation is detected. The connected devices are building technology devices and in particular emergency lighting means providing emergency illumination. In particular, a battery unit of the emergency unit is charged in case an AC power is available at the emergency unit.

The emergency unit can be part of an operating arrangement, in which the emergency unit is linked to and/or monitors a voltage output by a power supply unit. Therefore, the emergency unit can be arranged in close proximity to or even in a common enclosure with the power supply unit, but can also be spatially separated from the power supply unit.

BACKGROUND OF THE INVENTION

Building technical devices can be connected to the emergency unit and/or the power supply unit. Typically a group of devices is supplied from the power supply unit in a non-emergency mode of operation, while other devices are supplied from the emergency unit in an emergency mode of operation. However, the emergency unit can also supply the devices supplied from the power supply unit in the non-emergency case.

The building technical devices connected to the emergency unit and/or the power supply unit, in the following also referred to as connected devices, can be actuators and/or sensors used in a building, such as electrical drives for opening or shutting doors or windows, for controlling ventilation or for sensing smoke, heat, or humidity. While generally a large variety of building technical devices can be supplied and driven by the emergency unit or the operating arrangement according to the invention, the following focuses on lighting means or luminaries comprising lighting means, especially lighting means comprising LEDs. The lighting means also can especially be LEDs.

While emergency units and also modular arrangements are known in the art, e.g. from WO 2011/124723 A1, the invention improves reliability of the detection of an emergency state but also on maintaining operation of the connected devices, especially the connected lighting means.

The emergency unit is typically supplied by an AC supply, typically a mains voltage or power. The emergency unit can be in particular supplied by a three phase mains system. The emergency unit can be connected to all three phases of the three phase mains system or a subset thereof. Hence, if only one phase fails the emergency unit can still be supplied with two phases of the three phase mains system. Further, a DC grid is typically supplied by the power supply unit. The power supply unit preferably is supplied from the same AC supply as the emergency unit and can comprise an AC/DC converter to convert the AC supply voltage to the voltage for the DC grid. The power supply unit can also be connected to the AC supply by three phases of the three phase mains system. Specifically, the power supply unit and the emergency unit are supplied by only one common phase.

SUMMARY OF THE INVENTION

Generally, the invention addresses a requirement of central and group battery emergency lighting systems to offer an AC emergency mode. This means that if a phase of a supply in a building fails or a circuit breaker fails as part of the installation, a trigger signal is sent to initiate an AC emergency event. As a result, emergency lighting means at the emergency bus are operated at their defined emergency level. In conventional systems, power is not taken from the battery if normal mains supply is still present. While it is commonly known that an emergency unit monitors an AC supply to operate the building technology devices connected to the emergency bus in case the AC power delivered by the AC supply fails, the emergency unit described herein is configured especially to also deal with conditions in which the AC power supply and/or DC grid power fails.

Therefore, the emergency unit also detects whether the power supply unit correctly delivers a DC voltage to the DC grid. The emergency unit can therefore also detect a failure of the power supply unit and may operate the building technology devices connected to the emergency bus in case the power supply unit fails. In case the power supply unit cannot supply the DC grid, the emergency unit of the invention is configured to supply the emergency lighting means connected to the emergency bus. It should be understood that emergency lighting means as well as non-emergency lighting means can be supplied by the power supply unit during normal operation. However, the emergency lighting means can be connected to a specific segment of a DC bus that is connected to the emergency unit. The emergency lighting means are typically configured to operate in a normal operation mode serving for general illumination. In an emergency mode, the emergency lighting means then switch to an emergency lighting mode, in which they, e.g. operate with a different emission spectrum, and/or in a dimmed mode.

The emergency unit according to the invention comprises a battery, a DC/DC converter supplied by the battery and a control unit configured to control operation of the DC/DC converter and a battery charging unit designed for charging the battery unit. The emergency unit can further comprise a first monitoring module for monitoring the AC voltage or power supplied to the emergency unit by the AC supply, a second monitoring module for monitoring the DC voltage or power supplied by the power supply unit to the DC grid, and/or preferably a third monitoring module for monitoring the battery unit and in particular to monitor charging and discharging of the battery unit.

The control unit of the emergency unit, which can be an microcontroller, an IC, an ASIC, etc. controls operation of the DC/DC converter. Therefore, especially in case of the AC power supply to the emergency unit at least partially fails, which means that for example a phase of a three phase mains system fails, or that the AC power is outside a specified parameter range (i.e. an AC voltage or current supplied to the emergency unit is too low or too high or fluctuates) the control unit activates the DC/DC converter, which is then supplied from the battery unit. After the activation of the DC/DC converter, the power produced by the DC/DC converter is output at DC power output terminals of the emergency unit to the emergency bus. At the same time, if there is still at least a partial AC power supplied from the AC supply, the control unit controls the battery charging unit to charge the battery unit using the available AC power. However, in an initial state, the DC/DC converter drives the emergency bus out of power from the battery unit.

Thus, by operating the DC/DC converter, a DC power is supplied to the emergency bus, supplying the emergency lighting means. After the DC/DC converter provides the power at the DC power output terminals, the emergency lighting means can be operated.

The battery charging unit starts charging the battery unit as soon as a discharging current and/or voltage is detected by the third monitoring module to compensate for the battery drain (in case any AC power is available). The battery unit hence functions as a buffering capacitor. Preferably, the energy/current taken up by the DC/DC converter is therefore immediately compensated by the charging function of the battery charging unit.

Therefore, essentially, the invention proposes to drive the emergency bus in order to operate the emergency lighting means by power supply from the battery unit, while at the same time, essentially immediately, recharging the battery unit out of the AC mains power using the battery charging unit power provided that in particular at least two phases of the main voltage are fully operative. In addition, the emergency unit according to the invention is also configured to provide a DC power if only the DC grid power provided by the power supply unit fails, the control unit will control a relay of the emergency unit to switch the external DC grid power from the external power supply unit to the DC power supplied by the DC/DC converter of the emergency unit. The lighting means connected to the emergency bus can thus be operated as normal lighting means during normal operation, but may be operated in an emergency mode in case an emergency is detected. The voltage output by the emergency unit in the emergency state may be different from the voltage output by the power supply unit and can in particular be higher. The emergency lighting means at the emergency bus preferably detect the emergency situation by detecting a voltage drop when the emergency unit takes over operation followed by a voltage soar caused by the supply provided from the emergency unit. The building technology devices may therefore connected to the emergency bus can then switch operation to emergency operation, e.g. connected emergency lighting means (which includes lighting means providing an emergency mode) operate with a brightness dimmed to a specific degree. Non-emergency devices may be switched off in case of emergency operation.

The invention therefore provides an emergency unit, a lighting system and a method for operating an emergency unit according to the independent claims. Further aspects of the invention are subject to the dependent claims.

In a first aspect, an emergency unit is provided, comprising input terminals for supplying the emergency unit with AC power, a battery charging unit designed for charging a battery unit of the emergency unit by using the AC power, a DC/DC converter designed to provide DC power to DC power output terminals designed for supplying power to emergency lighting means, a control unit designed for being supplied with a signal indicating the state of the AC power and for outputting commands to the battery charging unit and to the DC/DC converter. The control unit can assume a state in which it causes the DC/DC converter to provide DC power based on the battery power and at the same time start the operation of the battery charging unit can assume the state in case the AC power at least partially fails and/or is outside a predefined parameter range. The parameter range in particular defines characteristic values for a voltage, power and/or a current supplied to the emergency unit and/or threshold values for the voltage, current and/or power supplied that may not be exceeded or surpassed.

The AC power is supplied by at least one phase of a three phase mains system. In particular, the emergency unit can be connected to one phase, L1, L2, and/or L3 and to the neutral line N.

The emergency unit can further comprise a second monitoring module to monitor a DC grid power supplied to a DC grid, and wherein the second monitoring module is connected to the DC grid at DC power input terminals.

The second monitoring module may issue a second signal indicating a failure of the DC grid power to the control unit. The control unit can activate the DC/DC converter to provide the DC power at the DC power output terminals, a third monitoring module can monitor charging and/or discharging of the battery unit, and the battery charging unit may be a further DC/DC converter, in particular a flyback, buck or boost converter.

The first and/or the second monitoring module can issue a signal to the control unit when the AC power and/or the DC grid power is interrupted, preferably longer than a predetermined time. The first and/or the second monitoring module can therefore comprise an energy buffer and/or a timer and may issue the signal when the energy buffer depletes or the timer reaches a predefined timer value.

The control unit can activate the charging unit in case the supplied DC grid power fails and the AC power is supplied at least partially to the AC input terminals in series with capacitive elements of the battery unit. The measurement element preferably is a shunt resistor.

The emergency unit may comprise a relay unit. The control unit can control the relay unit and can switch the DC power provided by the DC/DC converter to the DC power output terminals from the DC grid power supplied at the DC power input terminals upon a command of the control circuit, and a voltage of the output DC power provided by the DC/DC (10) converter is higher, preferably 55 Volts, than the voltage of the DC grid power.

In another aspect, an emergency unit is provided, comprising AC input terminals for supplying the emergency unit with AC power and/or DC input terminals for providing the emergency unit with DC grid power, a battery charging unit designed for charging a battery unit of the emergency unit preferably by using the AC power, a DC/DC converter, supplied by the battery unit and designed to provide DC power to DC power output terminals designed for supplying power to emergency lighting means, a control unit designed for being supplied with a signal indicating the state of the DC grid power and/or the AC power and for outputting commands to the battery charging unit and to the DC/DC converter. The control unit can assume a state in which it causes the DC/DC converter to provide DC power to the DC power output terminals based on the battery power when the signal indicating the state of the DC grid power indicates a failure of the DC grid power and, if AC power is supplied, at the same time start the operation of the battery charging unit.

In yet another aspect a lighting system is provided, comprising an emergency unit as described herein.

In still another aspect, an emergency operating arrangement is provided, comprising an emergency unit as described herein, and a power supply unit providing DC grid power to DC power input terminals of the emergency unit, wherein the power supply unit and the emergency unit are supplied by the same three phase mains system, wherein the emergency unit is preferably supplied from different phases of the three phase mains system than the power supply unit.

In a further aspect, a method for operating an emergency unit is provided, comprising the steps of receiving, at input terminals, an AC power for supplying the emergency unit, charging, by a battery charging unit, a battery unit of the emergency unit using the AC power, supplying a DC/DC converter from the battery unit and providing DC power to DC power output terminals designed for supplying power to emergency lighting means, supplying, to a control unit, a signal indicating the state of the AC power, and outputting, by the control unit, commands to the battery charging unit and to the DC/DC converter. The control unit assumes a state in which it causes the DC/DC converter to provide DC power based on the battery power and at the same time start the operation of the battery charging unit.

BRIEF DESCRIPTION OF THE DRAWINGS

The invention is now also described with reference to the figures. In particular.

DETAILED DESCRIPTION

The emergency unit described herein allows to control a charging unit (i.e. a flyback, buck or boost converter) to regulate a battery charging in a way that if an AC emergency event is triggered, power can be regulated both for the battery charging unit and the driving of the emergency lighting means.

Figure 1:
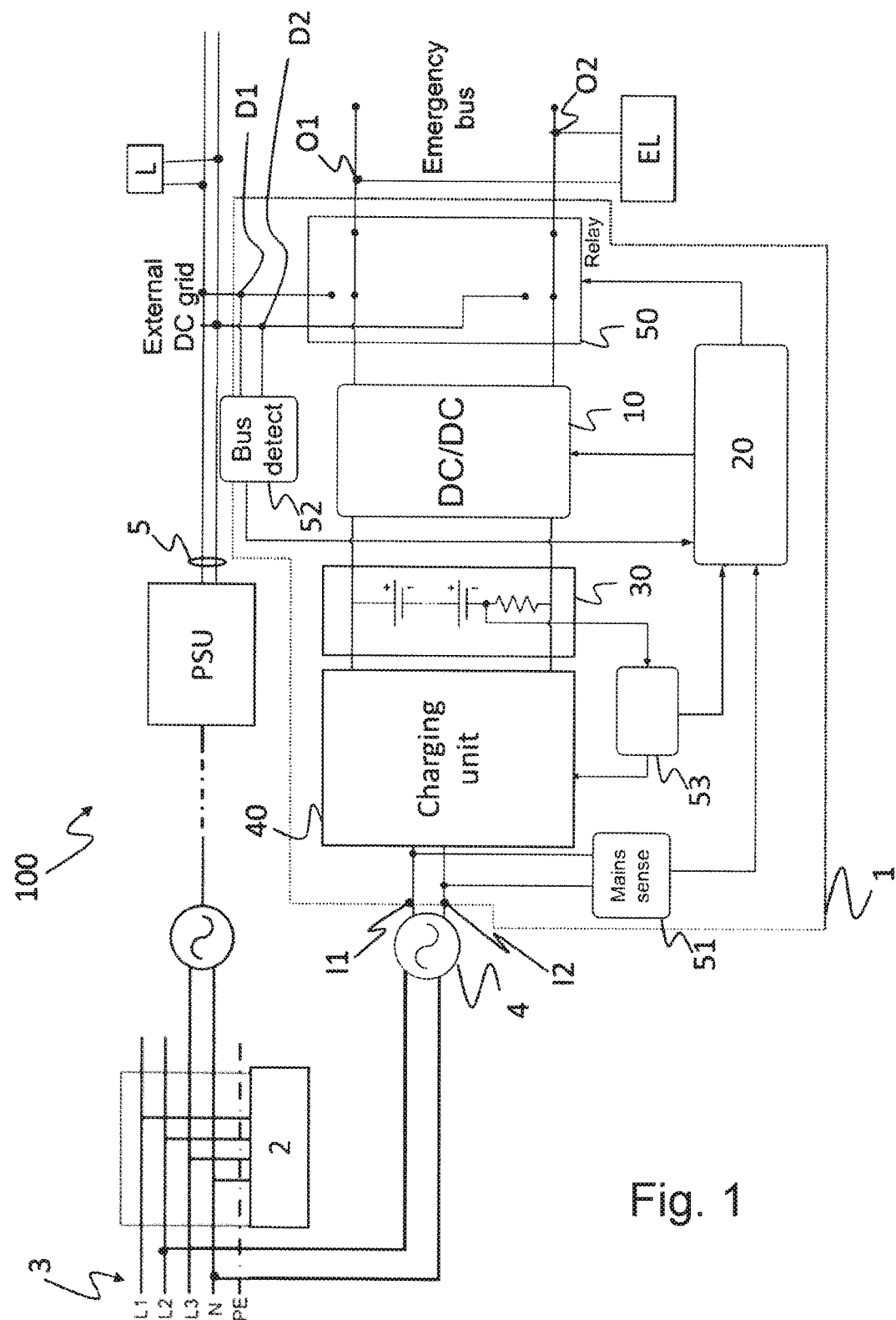
FIG. 1 illustrates schematically the emergency unit according to the invention.

FIG. 1, shows an exemplary setup of the employed emergency unit 1 inside a DC infrastructure 100. In FIG. 1 it is illustrated that there is a detection circuit 2 monitoring phases L1, L2, L3 and N (neutral) of the three phase mains supply system 3. The detection circuit 2 can typically be a rail mounted unit in a distribution cabinet of a building.

The detection circuit 2 can detect a phase failure and can then trigger an emergency event. However, as long as the emergency unit 1 is still powered from an AC power supply 4, i.e. is still powered from at least one phase, e.g. L2 and N, in addition to or different from a failed phase, e.g. L3, the emergency unit 1 can still use the remaining AC power for its operation.

In case the AC power supply 4 fails, which in this case means that at least phase L2 of the three phase mains system 3 fails (or in case the emergency unit 1 can no longer be sufficiently supplied), a failure of the AC power is detected by the emergency unit 1 and emergency lighting means EL will be operated and supplied off a battery unit 30 of the emergency unit.

In case there is still AC power supplied to the emergency unit 1, the emergency unit will switch to a state, in which an internal DC/DC converter 10 is activated/operated by a control unit 20 to output DC power to DC power output terminals O1, O2 of the emergency unit 1, but at the same time, uses the AC power still supplied at input terminals I1, I2 to charge the battery unit 30 of the emergency unit 1. To achieve this, the control unit 20 controls operation of a battery charging unit 40 to charge the battery unit 30 from the remaining AC power.

In addition, a power supply unit PSU is shown external to the emergency unit 1. The power supply unit PSU supplies power to a DC bus 5 (used for general illumination in normal operation by supplying lighting means L with DC power) as well as the emergency lighting bus. If the power supply unit PSU fails, the emergency unit 1 will take over supply of the emergency bus by switching the DC power output terminal O1, O2 to the DC power provided by the DC/DC converter 10.

The DC power supplied by the power supply unit PSU is fed to the emergency unit at DC power input terminals D1, D2 and a second monitoring module 52 can be used to detect the case when the DC power supplied from the power supply unit PSU fails. Such an event can also trigger the emergency lighting means to illuminate EL. This function can e.g. be used to allow people in a building to safely exit the building.

Especially, in case the power supply unit PSU fails while normal AC supply voltage is still present, a typical emergency unit would not detect an emergency situation and an emergency event would not be triggered as the AC power supply is still as normal. However, when the external power supply PSU fails, no power is supplied to the DC bus 5 and the lighting means L as well as the emergency lighting means EL fail and go dark. No emergency situation would be detected by a normal emergency unit, but is by the emergency unit according to the invention. It should be understood that the lighting means and emergency lighting means can also be other building technical devices.

Typically, the emergency unit 1 can for example output a power of 10 or 25 to 35 Watts, in particular about 15 or 30 Watts to the emergency bus. The battery charging unit 40 is configured to be flexible for different configurations of the battery unit 30, such as Pb—, NiCd—, NiMh-, and/or Li-ion battery units. The battery charging unit 40 preferably comprises a fly back converter. The battery charging unit 40 of the emergency unit can be configured to provide DC power to the emergency bus and to charge the battery unit 30 with, for example, a power of 10-20 Watts and especially with a power of 15 Watts.

Figure 2:
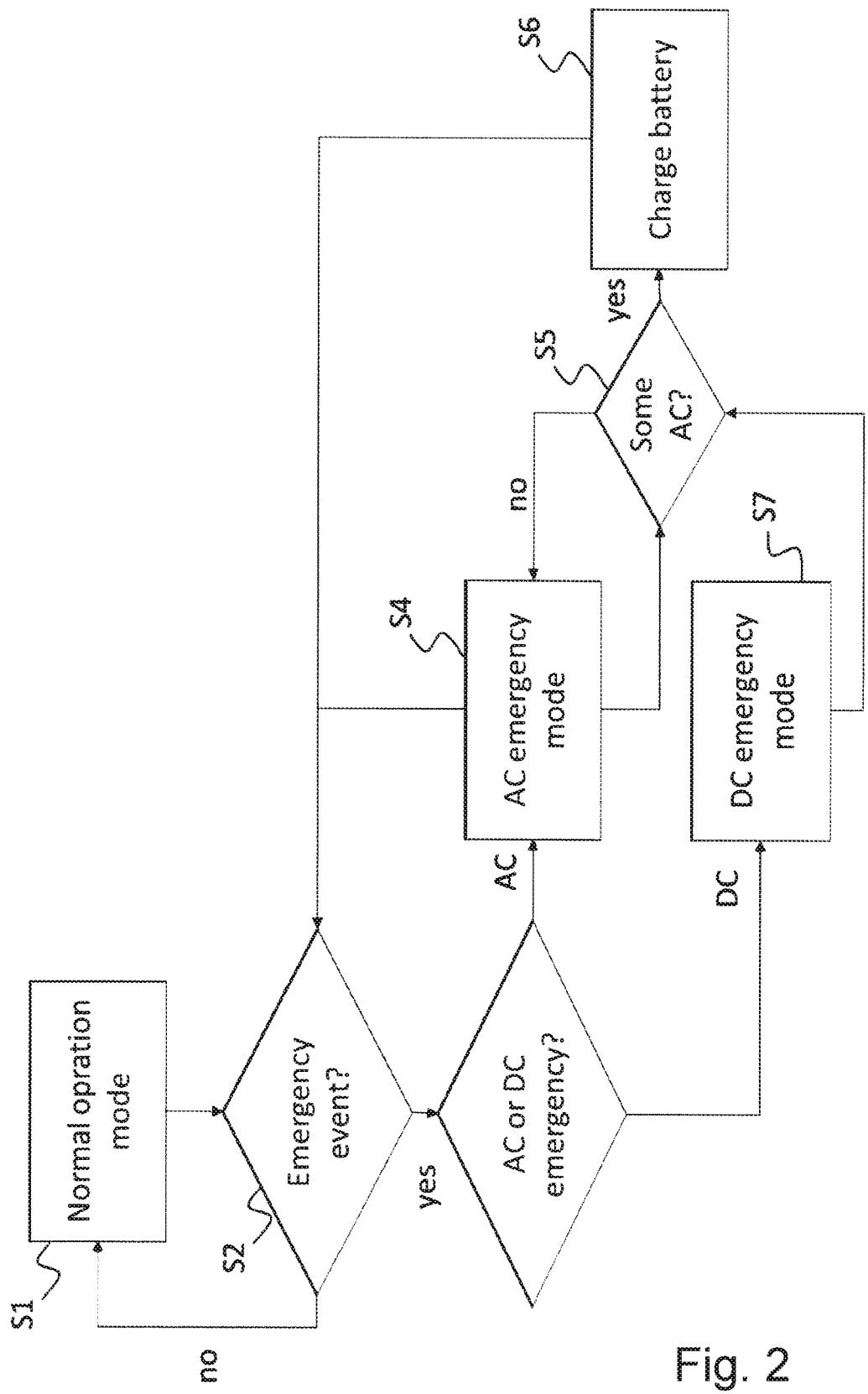
FIG. 2 shows a flow chart illustrating operation of the emergency unit.

Now also in view of FIG. 2 the function of the emergency unit should be explained. In normal mode S1, the DC/DC converter 10 is off. In mode S1, a relay unit 50 connects the emergency bus to the power supply unit PSU. The power supply unit PSU (which can also be part of the emergency unit 1) preferably supplies a DC supply voltage of 48 Volts. The battery unit 30 is charged from the battery charging unit 40 (in intervals and/or when a third monitoring module 53 detects that a specific discharge level is reached). Charging and/or discharging of the battery is monitored by the third monitoring module 53, for example at a resistor connected in series with capacitive elements of the battery unit 30

The control unit 20 can now check whether an emergency event occurs (Step S2). The control unit 20 can detect an AC or DC emergency event in mode S2 by evaluating signals fed to the control unit by the monitoring modules 51, 52, 53. For example, an AC emergency event can be detected by a first monitoring module 51 monitoring the AC power output to the emergency unit 1 at input terminals I1, I2 from the AC power supply 4. The first monitoring module 51 may issue a respective detection signal to the control unit 20 in case the AC power monitored by the first monitoring module 51 either fails partially, completely or is outside of predefined characteristic parameter ranges for the AC power supply. The control unit then assumes a state S4 (AC emergency mode). In this mode the control unit 20 switches on the DC/DC converter 10. The DC/DC converter 10 takes power from the battery unit 30. The control unit 20 will control the relay unit 50 to switch the power output by the DC/DC converter 10 derived from the battery unit 30 to the output terminals O1, O2. The emergency bus is supplied by the DC/DC converter 10 and the battery unit discharges.

However, the battery charging unit 40 will try to maintain a charging current for the battery unit and the third monitoring module 53 will also detect a discharge current.

Thus, in case there is at least some AC power being supplied to the emergency unit 1 in step S5, the control unit 20 will automatically increase power supplied from the battery charging unit 40 (i.e. the fly back converter) to supply power for charging the battery unit 30 in step S6, which in turn produces power to operate the emergency lighting means EL at the emergency bus. Therefore, in case the external AC power supply fails only partially and there is still some AC power supplied to the emergency unit 1, the emergency unit 1 will use this power to power the emergency bus from the DC/DC converter 10 while at the same time the battery charging unit 40 is used to (re-) charge the battery unit 30.

The control unit 20 can also detect a DC emergency event (step S2) by evaluating signals fed to the control unit from the second monitoring module 52. For example, a DC emergency event can be detected by the second monitoring module 52 monitoring the DC power output to the emergency unit 1 from the power supply unit PSU. The second monitoring module 52 may issue a respective detection signal to the control unit 20 in case the DC power monitored by the second monitoring module 52 either fails or is outside of predefined characteristic parameter ranges for the DC supply. The control unit then assumes a state S7 (DC emergency mode). In this mode the control unit 20 switches on the DC/DC converter 10. The DC/DC converter 10 takes power from the battery unit 30. The control unit 20 will control the relay unit 50 to switch the power output by the DC/DC converter 10 and derived from the battery unit 30 to the output terminals O1, O2. The emergency bus is supplied by the DC/DC converter 10 and the battery unit discharges.

However, the battery charging unit 40 will try to maintain a charging current for the battery unit and the third monitoring module 53 will also detect a discharge current. Since there is still AC power being supplied to the emergency unit 1 in step S5, the control unit 20 will increase power supplied from the battery charging unit 40 (i.e. the fly back converter) to supply power for (re-)charging the battery unit 30, which in turn produces power to operate the emergency lighting means EL at the emergency bus. Therefore, in case the power supply unit PSU and hence the DC supply fails, but there is still, at least partially, some AC power supplied to the emergency unit 1 (state S5), the emergency unit 1 will power the emergency bus from the DC/DC converter 10 while at the same time the battery charging unit 40 is used to charge the battery unit 30.

Of course, the control unit 20 can cyclically check whether the emergency operation still is present. If the signals fed to the control unit no longer indicate an emergency situation, normal operation S1 can be assumed. Also, an AC emergency mode S4 may be detected in a DC emergency mode S7 if the AC power fails to some degree, and vice versa.

Therefore, in case there is still some AC power supply for the emergency unit 1, the emergency unit will power the emergency bus from the DC/DC converter 10 while at the same time the battery charging unit 40 is used to charge the battery unit 30 (state S6).

In addition, the DC/DC converter 10 can be operated by the control unit 20 to switch its output voltage to a DC voltage of 55 Volts. As a result, the emergency lighting means EL connected to the emergency bus can detect the existence of an emergency state, for example, by detecting the voltage increase to 55 Volts DC from a normal operating voltage of 48 Volts DC. Therefore, the emergency lighting means can operate at a lower output level, e.g. dimmed to a level of 10% to allow operation of the emergency lighting means for an extended time to provide an emergency light output.

The charging unit 40 can alternatively be also realized as a buck or boost converter. The monitoring modules 51, 52, 53 may output detection events to the control unit 20 and especially when AC power and/or a DC grid power (partially) fails or is interrupted, in particular for a predetermined time.

The battery unit 30 may clamp the output of the charging unit 40 and provides a power supply to the DC/DC converter (which can be a buck or boost converter as well) used for supplying the emergency bus. In this way, the DC/DC converter is initially powered from the battery unit, which also allows transient events and switch overs to be covered without power loss. Battery charging is also sensed by the third monitoring module 53 at the resistor connected in series with capacitive elements of the battery unit 30. Thereby, excessive losses in the emergency unit 1 when operating in AC mode/normal mode can be prevented. The at least one sensing resistor preferably is only connected in series with the capacitive elements of the battery unit 30 and hence with the battery charging current and not with the AC power supply.

If there is still some kind of AC power supplied to the emergency unit the battery charge current is maintained as the battery charging unit recharges the battery unit and therefore replaces the current which was diverted when the DC/DC converter starts supplying the emergency bus. Therefore, monitoring for failure of the DC grid power supply as well as a failure in the AC power supply can be detected by the emergency unit 1 and can be handled in both cases—the emergency lighting means on the emergency bus can be operated.

In an alternative embodiment, the DC bus 5 and the emergency bus may be formed by the same grid to which both the lighting means L as well as the emergency lighting means EL are connected. In such case the DC bus 5 forms the emergency bus in an emergency case. The lighting means L and the emergency lighting means EL may be connected to the same bus. In such example the emergency lighting means EL which are connected to the DC bus 5 is operated as normal lighting means during normal operation, but is operated in an emergency mode in case an emergency is detected. If the voltage output by the emergency unit 1 in the emergency state is different from the voltage output by the power supply unit PSU, in particular higher, the emergency lighting means EL detects the emergency situation by detecting a voltage drop when the emergency unit takes over operation followed by a voltage soar caused by the supply provided from the emergency unit. In emergency mode the emergency unit 1 is designed to power the DC bus 5 with a voltage output different from the voltage output by the power supply unit PSU and takes over the supply of the DC bus 5 from the power supply unit PSU. The building technology devices which are connected to the bus then switch operation to emergency operation, e.g. connected emergency lighting means EL are operated with a brightness dimmed to a specific degree below 100% lighting level. The lighting means L (as non-emergency means) is switched off in case of emergency operation in order to save battery power.

Signaling of emergency operation may be also performed by transmission of a control signal. For instance a power line communication (PLC) may be applied to signal an emergency mode, e.g. by transmission of high-frequency PLC signals. The emergency lighting means EL and lighting means L may detect the emergency operation by monitoring of the voltage of the bus, e.g. of the emergency bus and/or the DC bus 5.

The invention claimed is:

1. An emergency unit (1) comprising:
   AC input terminals (I1, I2) for supplying the emergency unit (1) with AC power;
   DC input terminals (D1, D2) for providing the emergency unit with DC grid power;
   a battery charging unit (40) designed for charging a battery unit (30) of the emergency unit using the AC power;
   a DC/DC converter (10) supplied by the battery unit (30) and configured to provide DC power to DC power output terminals (O1, O2) for supplying power to emergency lighting means (EL); and
   a control unit (20) configured to be supplied with a signal indicating the state of the DC grid power and for outputting commands to the battery charging unit (40) and to the DC/DC converter (10); wherein
   the control unit operates in a DC emergency mode and assume a state in which the control unit causes the DC/DC converter to provide DC power to the DC power output terminals (O1, O2) based on the battery unit when the signal indicating the state of the DC grid power indicates a failure of the DC grid power (S7) and, if AC power is supplied, at the same time starting (S5) the operation of the battery charging unit (40).

2. The emergency unit (1) according to claim 1, wherein the control unit (20) is also configured to be supplied with a signal indicating the state of the AC power supplied to the AC input terminals and is further configured to operate in an AC emergency mode when the signal indicates that the AC power has at least partially failed and/or is outside a predefined parameter range, and further wherein the control unit switches on the DC/DC converter to take power from the battery unit when in the AC emergency mode.

3. The emergency unit (1) according to claim 2, wherein the emergency unit (1) further comprises a first monitoring module (51) configured to issue the signal indicating the state of the AC power supplied to the AC input terminals.

4. The emergency unit (1) according to claim 3, wherein the emergency unit (1) comprises a second monitoring module (52) configured to monitor the DC grid power supplied to a DC grid, and wherein the second monitoring module (52) is connected to the DC grid at the DC power input terminals (D1, D2).

5. The emergency unit (1) according to claim 4, wherein the second monitoring module (52) is configured to issue the signal indicating a failure of the DC grid power to the control unit (20), when the DC grid power fails.

6. The emergency unit (1) according to claim 5, wherein a third monitoring module (53) is configured to monitor charging and/or discharging of the battery unit (30).

7. The emergency unit (1) according to claim 5, wherein the second monitoring module issues the signal to the control unit (20) indicating a failure of DC power when the DC grid power is interrupted, longer than a predetermined time.

8. The emergency unit (1) according to claim 1, wherein the AC power is supplied by at least one phase (L1, L2, L3) of a three phase mains system (3) to the AC input terminals.

9. The emergency unit (1) according to claim 1, wherein the battery charging unit (40) is a flyback, buck or boost converter.

10. The emergency unit (1) according to claim 1, further comprising a relay unit (50), wherein the control unit (20) is configured to control the relay unit (50).

11. The emergency unit (1) according to claim 10, wherein the relay unit (50) is configured to switch the DC power provided by the DC/DC converter (10) to the DC power output terminals (O1, O2) from the DC grid power supplied at the DC input terminals (D1, D2) upon a command of the control unit (20).

12. The emergency unit (1) according to claim 1, wherein a voltage of the DC power provided by the DC/DC (10) converter is higher than the voltage of the DC grid power.

13. A lighting system comprising an emergency unit (1) according to claim 1.

14. An emergency unit (1) comprising:
    AC input terminals (I1, I2) for supplying the emergency unit (1) with AC power;
    a battery charging unit (40) designed for charging a battery unit (30) of the emergency unit (1) using the AC power;
    a DC/DC converter (10), supplied by the battery unit (30) and configured to provide DC power to DC power output terminals (O1, O2) which in turn supply power to emergency lighting means (EL);
    a first monitoring module (51) configured to sense the AC power supplied to the emergency unit and output a signal indicating the state of the AC power, including whether the AC power has at least partially failed or is outside a predefined parameter range;
    a second monitoring module (52) configured to monitor DC grid power supplied to a DC grid, wherein the second monitoring module (52) is connected to the DC grid at DC power input terminals (D1, D2) to the emergency unit and is configured to output a signal indicating the state of the DC grid power;
    a third monitoring module (53) configured to monitor charging and discharging of the battery unit (30) and output a signal indicating whether the battery unit is charging or discharging; and
    a control unit (20) configured to receive the signal indicating the state of the AC power from the first monitoring module, the signal indicating the state of the DC grid power from the second monitoring module, and the signal indicating whether the battery unit is charging or discharging from the third monitoring module, and to output commands to the battery charging unit (40) and to the DC/DC converter (10);
    wherein the control unit (20) is further configured to operate in a DC emergency mode and assume a state in which the control unit causes the DC/DC converter (10) to provide DC power to the DC power output terminals based on the battery unit when the signal from the second monitoring module indicates that the DC grid power has failed, and at the same time enables the operation of the battery charging unit (40) if the signal from the first monitoring module indicates that AC power is available to the emergency unit and the battery charging unit, and further wherein the control unit (20) activates the charging unit (40) when the third monitoring module (53) detects a discharging current at the battery unit (30).

\* \* \* \* \*